United States Patent [19]

Martin et al.

[11] Patent Number: 4,556,138

[45] Date of Patent: Dec. 3, 1985

[54] FLUID FRICTION CLUTCH

[75] Inventors: Hans Martin, Stuttgart; Gerhard Stuetz, Renningen, both of Fed. Rep. of Germany

[73] Assignee: Sueddeutsche Kuehlerfabrik, Julius Fr. Behr GmbH & Co. KG, Stuttgart, Fed. Rep. of Germany

[21] Appl. No.: 554,811

[22] Filed: Nov. 23, 1983

[30] Foreign Application Priority Data

Nov. 27, 1982 [DE] Fed. Rep. of Germany ... 8233338[U]

[51] Int. Cl.$^4$ ............................................. F16D 35/00
[52] U.S. Cl. ............................. 192/58 B; 123/41.12; 192/82 T
[58] Field of Search ................... 123/41.12; 192/58 B, 192/82 T, 53 D

[56] References Cited

U.S. PATENT DOCUMENTS

| 2,452,264 | 10/1948 | Russell | 123/41.12 |
|---|---|---|---|
| 2,807,246 | 9/1957 | Jacobs | 123/41.12 |
| 3,179,221 | 4/1965 | Weir | 192/58 B |
| 3,250,355 | 5/1966 | Weir | 192/58 |
| 3,323,623 | 6/1967 | Roper | 123/41.12 |
| 4,007,819 | 2/1977 | Maci | 192/58 B |
| 4,056,178 | 11/1977 | Detty | 192/58 B |
| 4,228,880 | 10/1980 | Gee | 192/58 B |
| 4,246,995 | 1/1981 | Gee | 192/58 B |
| 4,270,641 | 6/1981 | Nonnenmann et al. | 192/82 T |
| 4,271,945 | 6/1981 | Budinski | 192/58 B |
| 4,346,797 | 8/1982 | Bopp | 192/58 B |

FOREIGN PATENT DOCUMENTS

| 0009415 | 6/1982 | European Pat. Off. | |
|---|---|---|---|
| 1270339 | 1/1969 | Fed. Rep. of Germany . | |
| 2804859 | 8/1981 | Fed. Rep. of Germany . | |
| 53-38836 | 4/1978 | Japan | 192/58 B |
| 53-68336 | 6/1978 | Japan | 123/41.12 |

*Primary Examiner*—Ronald H. Lazarus
*Attorney, Agent, or Firm*—Schwartz, Jeffery, Schwaab, Mack, Blumenthal & Evans

[57] ABSTRACT

Disclosed is a fluid friction clutch assembly, comprising a drive shaft; a primary disk mounted for rotation on the drive shaft; a driven clutch housing surrounding the primary disk and being rotatably supported with respect to the drive shaft, the clutch housing containing a partition therein defining a work chamber and a reservoir separated by the partition, wherein the partition includes in its radially outer area at least one overflow opening closeable by means of a valve lever comprised of a magnetic material and a return flow orifice associated with pump means for pumping a viscous torque-transmitting medium from the work chamber to the reservoir; a pulley member mounted on the drive shaft for driving the shaft and means, associated with the pulley member, for selectively magnetically actuating the valve lever, in order to selectively open and close the overflow opening.

9 Claims, 1 Drawing Figure

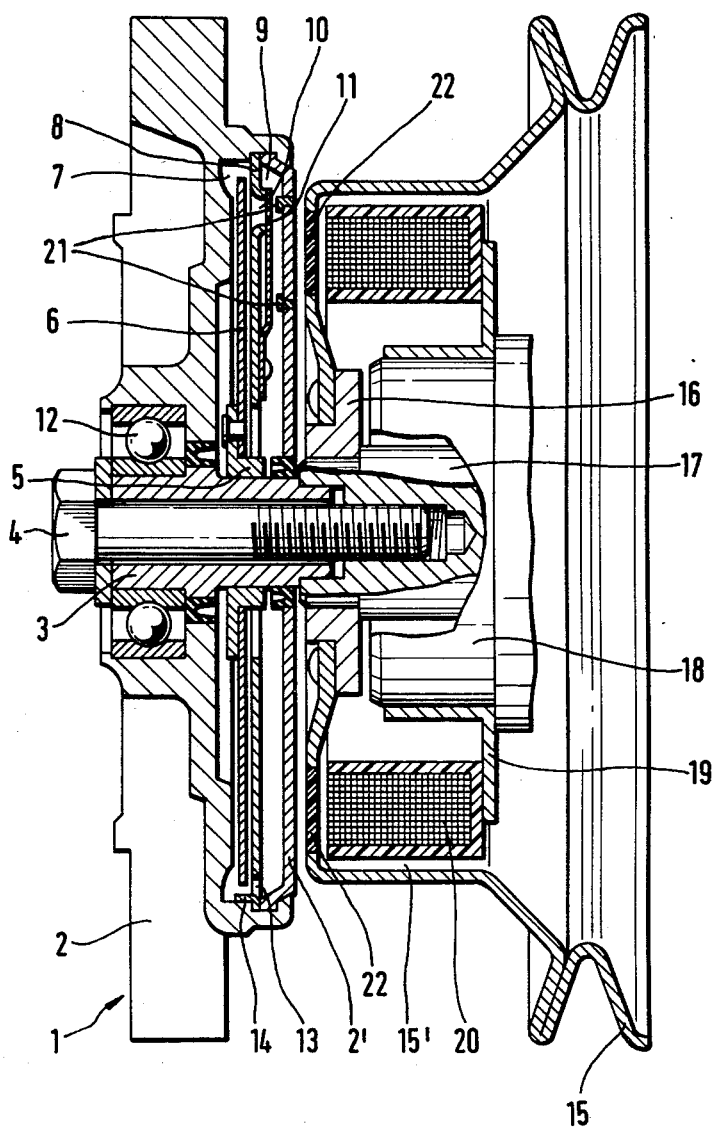

FLUID FRICTION CLUTCH

BACKGROUND OF THE INVENTION

The present invention relates a fluid friction clutch and more particularly to a fluid friction clutch of the general type disclosed in German Pat. No. 28 04 859 which is owned by the assignee of the present application. A fluid friction clutch of this type is utilized preferably to drive a cooling fan in an automotive engine.

Under certain conditions of installation, it can be a disadvantage of clutches of this type that the configuration with an electromagnet arranged on the front side of the clutch requires a relatively long structural length in the axial direction, especially, if the clutch is also equipped with a flange on its rear side which serves for mounting and for the transmission of torque on its rear side.

SUMMARY OF THE INVENTION

It is therefore an object of the present invention to provide an improved fluid fricton clutch.

It is a further object of the invention to provide a fluid friction clutch of the above-mentioned type in which the axial length of the clutch is shortened.

In accomplishing the foregoing objects, there has been provided in accordance with the present invention a fluid friction clutch assembly, comprising a drive shaft; a primary disk mounted for rotation on the drive shaft; a driven clutch housing surrounding the primary disk and being rotatably supported with respect to the drive shaft, the clutch housing containing a partition therein defining a work chamber and a reservoir separated by the partition, wherein the partition includes in its radially outer area at least one overflow opening closeable by means of a valve lever comprised of a magnetic material and a return flow orifice associated with pump means for pumping a viscous torque-transmitting medium from the work chamber to the reservoir; a pulley member mounted on the drive shaft for driving the shaft and means, associated with the pulley member, for selectively magnetically actuating the valve lever, in order to selectively open and close the overflow opening. Preferably, the actuating means comprises an annular magnet arranged coaxially within said pulley member, wherein the annular magnet has an electromagnetically effective radius which is located within the radial extent of said valve lever. Most preferably, the pully member includes a cylindrical cavity and the annular magnet is stationarily located in said cavity.

Further objects, features and advantages of the present invention will become apparent from the detailed description of preferred embodiments, which follows, when considered together with the attached FIGURE of drawing.

DETAILED DESCRIPTION OF PREFERRED EMBODIMENTS

According to the present invention, an annular magnet is arranged within the already existing V-belt pulley, and the valve lever is directly magnetically actuated by the annular magnet, in order to provide a compact configuration in the axial direction, i.e., a shortening of the installation length. A further shortening of the axial structural length is obtained by fastening the entire clutch, by means of a central, threaded bolt accessible from the front, with the V-belt pulley and/or the shaft end of the water pump shaft.

An exemplary preferred embodiment of the invention is shown in the drawing and shall be explained in more detail hereinbelow.

The drawing shows a fluid friction clutch 1, driven by a V-belt pulley 15 and used in a conventional manner to drive a fan for the radiator of an internal combustion engine in an automotive vehicle. The V-belt pulley 15 in this embodiment is fixedly mounted by means of a hub 16 for rotation on the shaft end 17 protruding from the housing 18 of a water pump, (not shown in further detail) for the internal combustion engine. The fluid friction clutch 1 is similarly fixedly mounted for rotation with respect to the end 17 of the water pump shaft, by means of a sleeve 3 which centrally and axially penetrates the clutch and which is fastened by means of the central threaded bolt 4 on the front side to the shaft end 17. The sleeve 3 carries on its circumference a hub 5 which is fixedly joined thereto for rotation, and the hub 5 in turn carries and drives the so-called primary disk 6. The clutch 1 comprises in its driven part essentially the clutch housing 2, which is closed off to the rear by a housing cover 2' and is rotatably supported on the sleeve 3 by means of a ball bearing. The clutch housing 2 on the driven side is divided by a partition 8 into a reservoir chamber 9 and a work chamber 7 containing the primary disk 6. In the partition 8, there is located on the one hand a overflow orifice 10 which may be closed or opened by a valve lever 11, with the valve lever 11 automatically closing the overflow orifice 10 by virtue of spring action. On the other hand, the partition 8 has in its radially outermost area a return flow opening 13 associated with a pump device 14 in the work chamber 7. For the details of this structure, reference is made to U.S. Pat. No. 4,270,641, the disclosure of which is incorporated by reference herein.

The work chamber 7 and the reservoir chamber 9 are respectively filled to a different degree with a viscous medium, which by means of its shear force effect is capable of transmitting a torque force from the primary disk 6 to the clutch housing 2. The torque transmission takes place by reason of the gap (not numbered) arranged on either side of the primary disk 6, to the extent that it is filled entirely or partially with the viscous medium. The mode of operation of the clutch is known: with the valve lever 11 closed, the viscous medium, with the exception of a slight residual volume, travels through the return flow opening 13 into the reservoir, while with the valve lever 11 open the overflow orifice 10 is opened and the viscous medium flows from the reservoir 9 into the work chamber 7. In a preferred embodiment, the reservoir 9 is disposed closer to the pulley 15 than the work chamber 7.

The valve lever 11 is actuated according to the invention by an annular magnet 20 arranged in the cylindrical cavity 15' of the V-belt pulley 15. The magnet is supported by means of a holder 19 on the housing 18 of the water pump of the internal combustion engine of the automotive vehicle. This annular magnet 20 has electrical connections, not shown, for its activation, whereby it may be activated preferably as a function of the temperature of the coolant for the internal combustion engine. Obviously, the activation of the annular magnet 20 may be equally effected as a function of other parameters of importance for the operation of the internal combustion engine.

In order to assure a concentrated magnetic flux, the following measures can be taken: (1) the wall of the V-belt pulley 15, which is made of a magnetic material, such as steel, can have "insulators" 22 (i.e., made from a nonmagnetic material) embedded therein, either as segments distributed about its circumference, or as a continuous ring, and (2) cores of soft iron 21 can be set into the clutch housing cover 2' (e.g., made of aluminum) in the region of the valve lever 11. In a preferred embodiment the valve lever 11 is disposed in the reservoir 9 and arranged in a rear portion of the clutch housing closest to the annular magnet 20. Upon the activation of the annular magnet 20, a directed and concentrated magnetic flux is generated outside of the insulators 22 and through the said soft iron cores 21, which lifts the valve lever 11, made of a magnetic material, against the force of its spring force from the overflow opening 10, thereby opening it. When the annular magnet 20 is deactivated, the valve lever 11 is returned by its spring force into its previous position, i.e. it closes the overflow opening 10 in the partition 8. Naturally, it is also possible to reverse the direction of the movement/action of the valve lever 11 and the annular magnet 20, so that, for example, the clutch 1 is engaged when current does not flow to the magnet 20.

By means of this axially very compact configuration, i.e., by the immediate succession of the clutch and the V-belt pulley, on the one hand, and the coaxial arrangement of the annular magnet 20 within the cavity 15' of the V-belt pulley 15, on the other, an appreciable shortening of the axial structural length of a clutch of this type is obtained, which is of particular advantage in the case when the clutch is installed in an automotive vehicle intended for passengers.

What is claimed is:

1. A fluid friction clutch assembly, comprising:
   a drive shaft;
   a primary disk mounted for rotation on said drive shaft;
   a driven clutch housing surrounding said primary disk and being rotatably supported with respect to said drive shaft, said clutch housing containing a partition therein defining a work chamber and a reservoir separated by the partition, said partition including in its radially outer area at least one overflow opening closeable by means of a valve lever comprised of a magnetic material and a return flow orifice associated with pump means for pumping a viscous torque-transmitting medium from the work chamber to the reservoir;
   a pulley member mounted on said drive shaft for driving said shaft;
   means, associated with said pulley member, for selectively magnetically actuating said valve lever for selectively opening and closing said overflow opening, said means for actuating including an annular magnet arranged coaxially within said pulley member, wherein said annular magnet has an electromagnetically effective radius which is located within the radial extent of said valve lever; and
   means for reinforcing a magnetic flux of the annular magnet, located between the annular magnet and the valve lever, and disposed in either the pulley member, or the clutch housing, or both the clutch housing and the pulley member.

2. A fluid friction clutch assembly according to claim 1, wherein said pulley member includes a cylindrical cavity and said annular magnet is located in said cavity.

3. A fluid friction clutch assembly according to claim 1, wherein said magnetic flux reinforcing means comprises at least one insert comprised of a strongly magnetic material.

4. A fluid friction clutch assembly according to claim 3 wherein said strongly magnetic material comprises soft cast iron.

5. A fluid friction clutch assembly according to claim 1, wherein the entire clutch is joined together with said pulley member by means of a central threaded bolt, insertable from the side of the clutch housing opposite said pulley member.

6. A fluid friction clutch assembly according to claim 5, wherein the entire clutch is fixedly joined by said bolt for rotation to the end of a shaft carrying said pulley member, and wherein said bolt passes centrally through a sleeve which axially penetrates said clutch.

7. A fluid friction clutch assembly according to claim 1, wherein said annular magnet is stationarily supported.

8. A fluid friction clutch assembly according to claim 7, wherein the annular magnet is supported by means of a holder mounted on the housing of a water pump for an internal combustion engine.

9. A fluid friction clutch assembly, comprising:
   a drive shaft;
   a primary disk mounted for rotation on said drive shaft;
   a driven clutch housing surrounding said primary disk and being rotatably supported with respect to said drive shaft, said clutch housing containing a partition therein defining a work chamber and a reservoir separated by the partition, said partition including in its radially outer area at least one overflow opening closeable by means of a valve lever comprised of a magnetic material and a return flow orifice associated with pump means for pumping a viscous torque-transmitting medium from the work chamber to the reservoir;
   a pulley member mounted on said drive shaft for driving said shaft, wherein the reservoir is disposed closer to the pulley member than the work chamber;
   means, associated with said pulley member, for selectively magnetically actuating said valve lever for selectively opening and closing said overflow opening, said means for actuating including an annular magnet arranged coaxially within said pulley member, wherein said annular magnet has an electromagnetically effective radius which is located within the radial extent of said valve lever, wherein the valve lever is disposed in the reservoir and arranged in a rear portion of the clutch housing closest to the annular magnet; and
   means for reinforcing a magnetic flux of the annular magnet, located between the annular magnet and the valve lever, and disposed in either the pulley member, or the clutch housing, or both the clutch housing and the pulley member.

* * * * *